United States Patent [19]

George et al.

[11] 4,336,011
[45] Jun. 22, 1982

[54] APPARATUS FOR APPLYING LINERS TO CLOSURES

[75] Inventors: Robert W. George, Naperville; Casper W. Miller, Mundelein; Kenneth Rapey, Chicago, all of Ill.

[73] Assignee: National Can Corporation, Chicago, Ill.

[21] Appl. No.: 172,076

[22] Filed: Jul. 24, 1980

Related U.S. Application Data

[63] Continuation of Ser. No. 906,770, May 18, 1978, abandoned.

[51] Int. Cl.³ .............................................. B29C 13/02
[52] U.S. Cl. ............................. 425/129 R; 425/110; 425/145; 425/150; 425/809
[58] Field of Search ............... 425/110, 150, 166, 256, 425/536, 809, 129 R, 145; 222/504; 264/268

[56] References Cited

U.S. PATENT DOCUMENTS

| | | | |
|---|---|---|---|
| 3,439,718 | 4/1969 | Wright et al. | 425/809 |
| 3,811,601 | 5/1974 | Reighard et al. | 222/504 |
| 3,963,396 | 6/1976 | Shotbolt | 425/809 |

Primary Examiner—James B. Lowe
Attorney, Agent, or Firm—Robert A. Stenzel; Ralph R. Rath

[57] ABSTRACT

A method and apparatus for molding and curing liners in cap closures includes a molding head having a plurality of molding stations, a feeding mechanism for feeding unlined caps with charges of lined material to the molding head and a take-off mechanism for removing the completed liner. The feeding mechanism consists of a dispensing unit which is capable of dispensing more than one-thousand charges of material per minute and includes a gun having a lining compound receiving chamber with a needle reciprocated therein. The needle is normally biased to a closed position and is electrically moved to an open position through a solenoid and a photosensing mechanism which accurately senses the position of a rotating wheel of the feeding mechanism.

6 Claims, 3 Drawing Figures

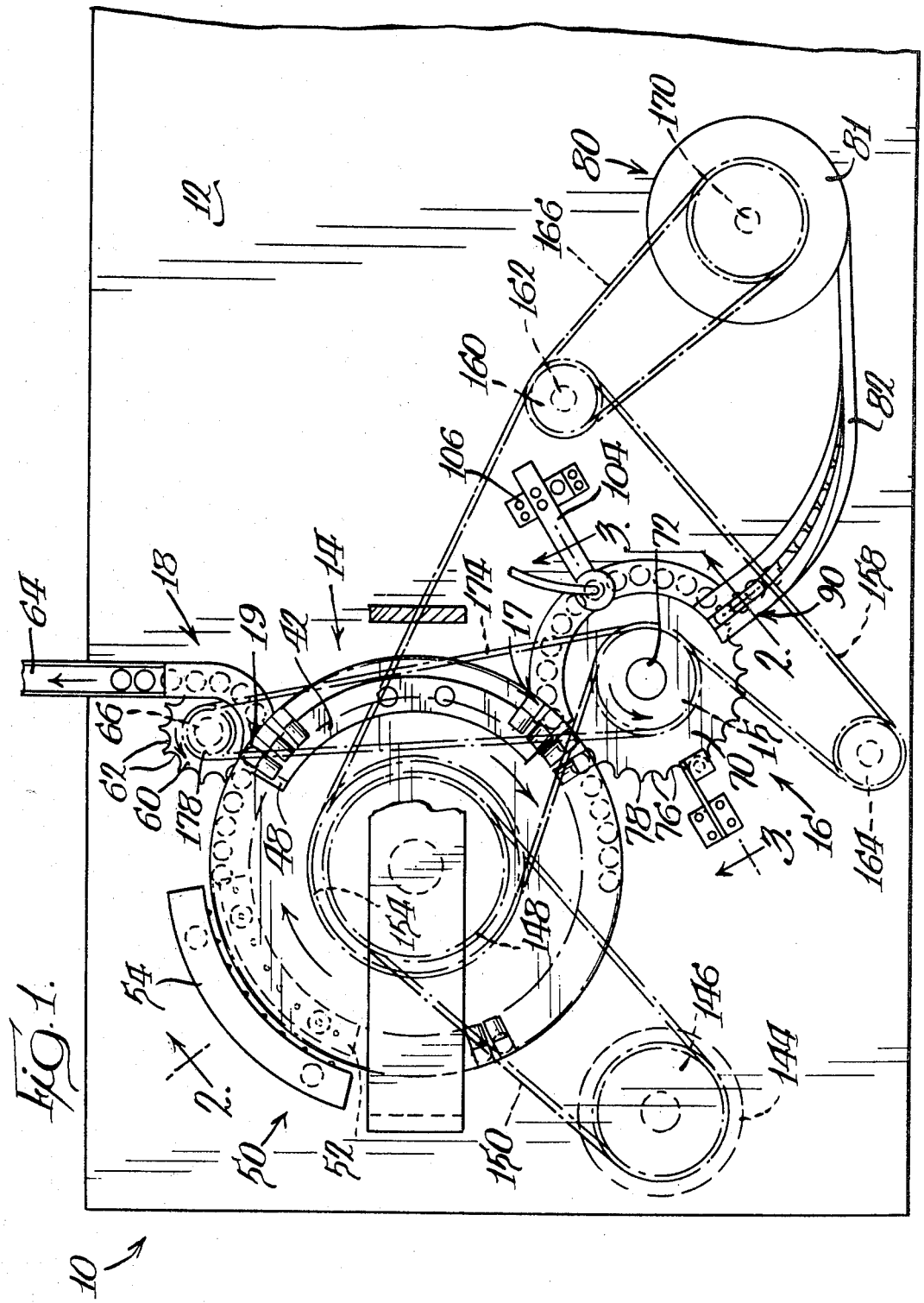

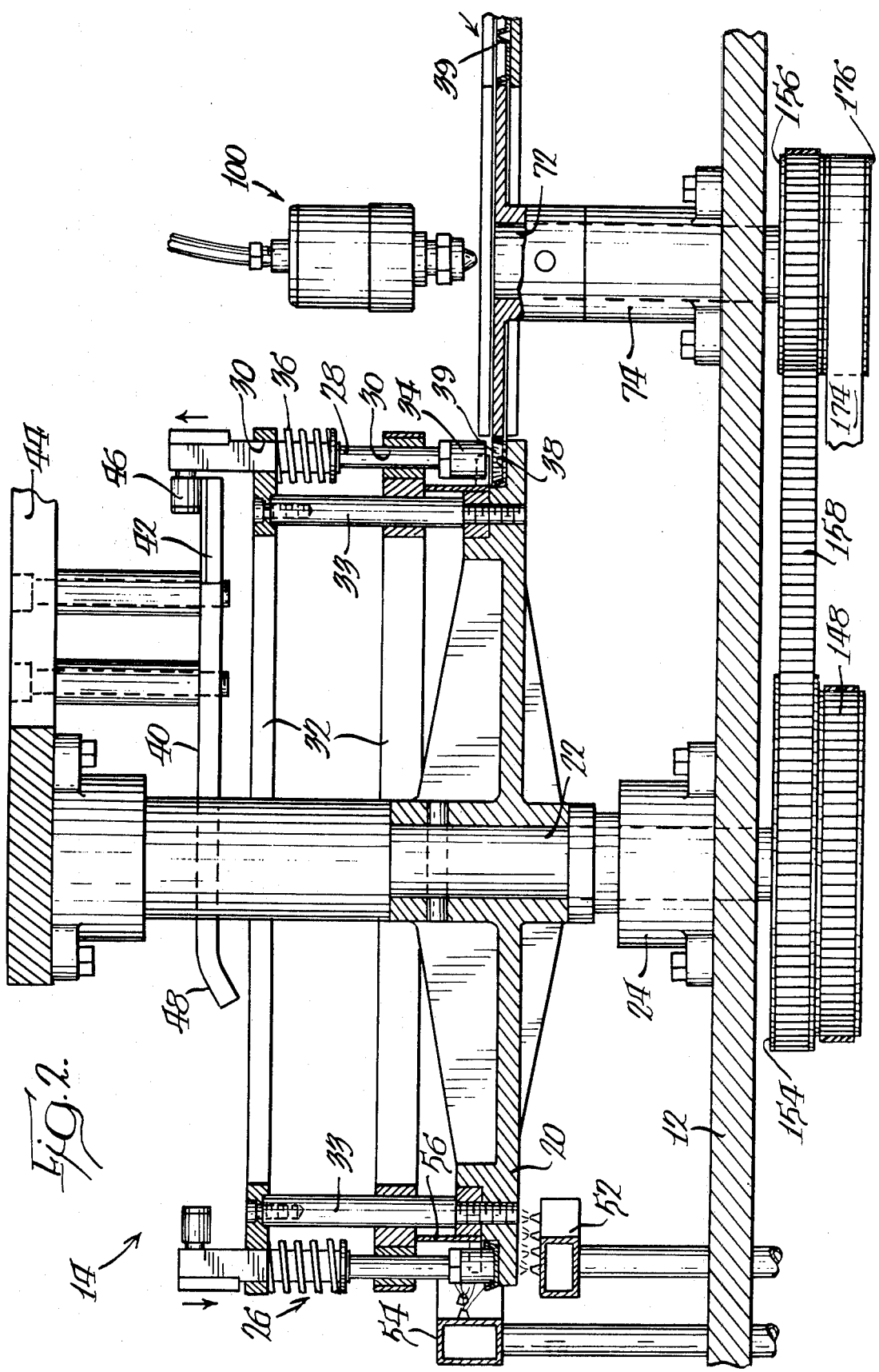

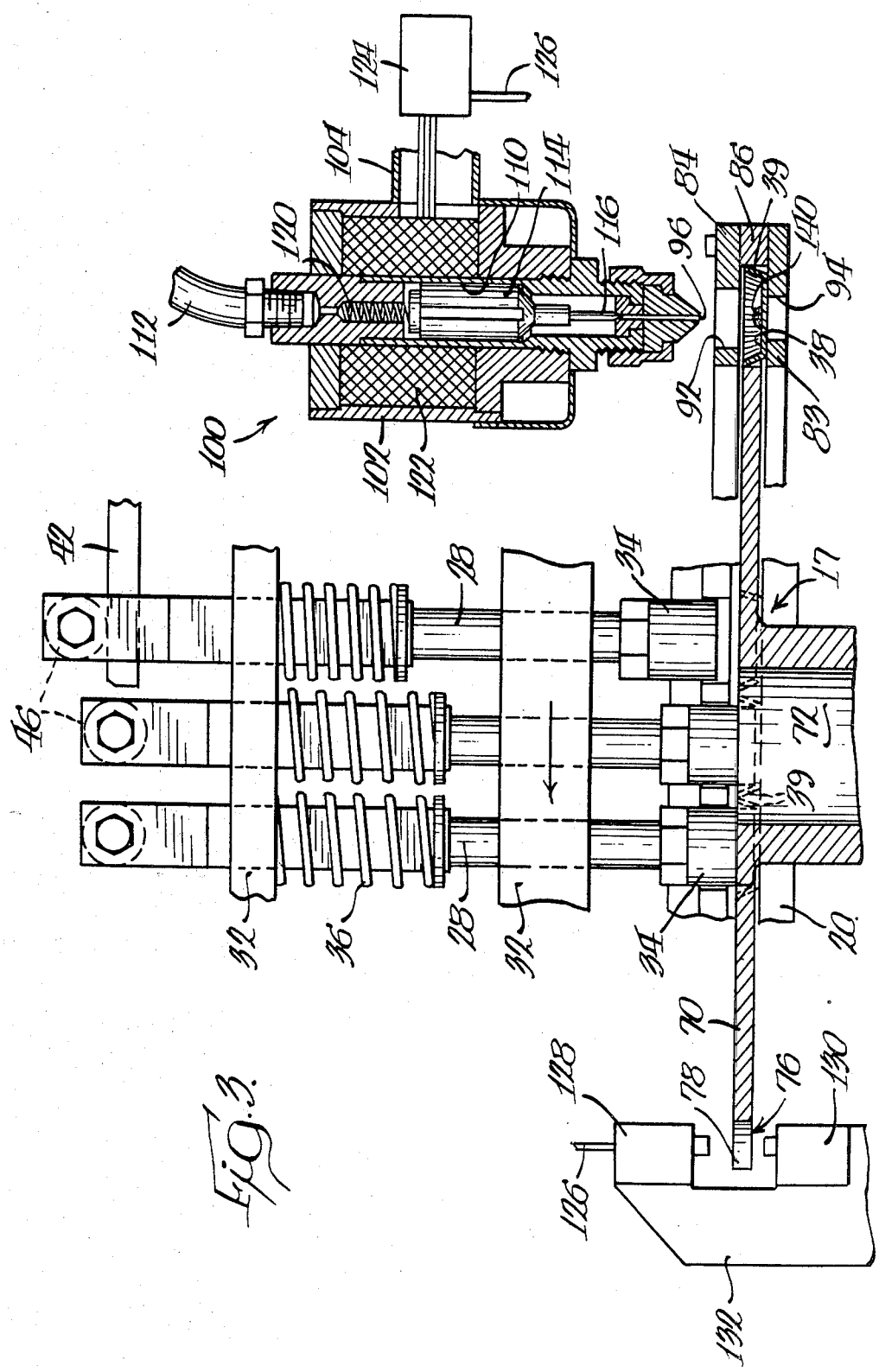

APPARATUS FOR APPLYING LINERS TO CLOSURES

REFERENCE TO RELATED APPLICATION

This application is a continuation of U.S. Ser. No. 906,770, filed May 18, 1978 now abandoned.

BACKGROUND OF THE INVENTION

The present invention relates generally to cap closures and more particularly to an improved method and apparatus for applying a liner of plastisol material to unlined cap closures.

For many years the conventional bottle closure consisted of a metal cap which had a cork disk secured therein which would seal against the top of a package to seal the contents therein.

In more recent years substantial activity and development has occurred in the plastic field and the utilization of plastic as a lining material has become substantially standard in the industry, replacing the conventional cork liner.

Various types of apparatus for applying liners to unlined cap closures have been proposed and are in existence at the present time. One type of apparatus that has been used extensively is disclosed in Aichele U.S. Pat. No. 3,135,019. This patent discloses a machine for applying liners of thermoplastic material to cap closures, particularly crown caps. In the machine disclosed in this patent, the caps are preheated and a heated thermoplastic material in a soft plastic condition is fed in metered amounts to the respective unlined caps. The thermoplastic material is then shaped or molded and set into a liner formation by a molding head that is rotated in a continuous fashion. A specific type of plastic metering means for the above machine is disclosed in Aichele U.S. Pat. No. 3,212,131 which is capable of feeding small charges of thermoplastic material at rates of approximately 300 caps per minute.

Another type of crown cap lining machine is disclosed in Simpson U.S. Pat. No. 2,954,585 which contemplates depositing predetermined amounts of a thermosetting plastic lining material into unlined caps and transferring the caps with the uncured plastic to a molding and curing turret which has circumferentially spaced clamps into which the plastic container caps are fed and clamped therebetween. The clamping members coact to clamp the lined cap during which heat is applied to cure the cap liners and the cured lined caps are then discharged through a take-off mechanism associated with the turret.

More recently, a more acceptable type of lining material has been developed which is capable of producing small voids in the material as the liner is being formed in the cap closure. This type of lining material includes a plastisol material, fillers and waxes plus a blowing agent which is deposited into the unlined cap closures and is subsequently heated to cure the liquid lining compound. During the curing process, the blowing agents dissolve at a predetermined temperature and create small voids in the finished and cured lining material in the cap closure. It has been determined that the small voids aid in producing a proper seal with a container, such as a glass bottle, which in many instances has small nicks or uneven upper edges to which the cap closure must be sealed.

In producing lined cap closures utilizing the material which results in creating small voids, it has heretofore been customary in producing such lined cap closures to feed unlined caps into a feeding mechanism where a predetermined charge of liquid uncured lining compound is applied to each of the caps. The caps with the charge of compound therein are then fed to a molding head having a plurality of circumferentially spaced molding stations thereon wherein the charges of uncured material are molded to a final configuration and at least partially cured so that the lining material is set within the cap closure. The cap closures are then moved through an oven wherein the temperature of the caps and the lining materials is increased sufficiently to dissolve the blowing agents and fully cure the plastisol material.

One of the problems inherent with the system that has been in use for some time is the limitation of the speed at which the uncured lining material can be fed to the unlined caps before they are delivered to a molding machine. For years, a maximum speed at which such liquid lining compound could be dispensed to the unlined caps was on the order of 600 charges per minute. Most types of dispensing units that are presently in existence and have been used for dispensing such products consist of some type of plunger arrangement mounted within a chamber having a packing material surrounding the plunger and which is reciprocated through a pressurized fluid source, such as air. Since the liquid compound must be fed to the dispensing unit under pressure, a packing seal must be placed around the periphery of the plunger to prevent the compound from leaking through the dispensing unit. The heat that is developed from the friction between the movable plunger and the stationary chamber and packing seal many times results in curing the liquid lining compound before it is dispensed thereby necessitating a shutdown to remove the partially cured material. With such a cycling system, it is also difficult to substantially increase the speed for a machine in view of the complexity of being able to reverse the cycle of air substantially beyond 600 cycles per minute.

SUMMARY OF THE INVENTION

According to the present invention, a unique dispensing system has been developed which can be utilized with existing compound lining machinery and which is capable of almost doubling the speed of output of the lining machine. The system is designed such that the charges of liquid lining materials are accurately fed to each of the closures in accurate predetermined charges through an electronically actuated dispensing mechanism which is capable of dispensing more than one-thousand charges per minute.

More specifically, a lining machine having a continuously rotating molding and curing head with a plurality of circumferentially spaced stations located on the periphery thereof has feed means for continuously supplying unlined caps having a curable fluid compound to each station and take-off means for removing the lined and cured caps from the respective stations with stationary heater means adjacent the molding and curing head for supplying heat to the respective stations.

The improved feed means consists of a continuously rotating feed wheel that has a plurality of circumferentially spaced pockets defined on the periphery thereof and which is driven in synchronized relation with the rotating molding and curing head. Unlined caps are fed to the respective pockets from a source and a dispensing means or metering means is located directly above and in alignment with the path for the respective pockets. The metering means consists of a metering gun having an outlet located above the path of the pockets with supply means for supplying pressurized curable fluid compound to the metering gun. The metering gun has a chamber therein with electronically actuated needle means movable between first and second positions within the chamber which respectively close and open the outlet. The needle means is normally biased to a closed position and has an electric solenoid associated therewith that, when energized, moves the needle means to a second position. Electric pulses are supplied to the solenoid or electric means from a sensing means in the form of a photoelectric cell which is spaced from the metering gun and senses the positions of the respective pockets on the continuously rotating feed wheel.

According to another aspect of the invention, all of the drive means for the respective driven members emanate from a single drive motor which is connected to the various rotating components through timing belts to provide more accurate synchronized drive between the respective components and reduce the maintenance required for the drive system.

BRIEF DESCRIPTION OF THE SEVERAL VIEWS OF THE DRAWINGS

FIG. 1 schematically discloses a top plan view of the cap lining machine having the present invention incorporated therein;

FIG. 2 is a fragmentary sectional view, as viewed generally along line 2—2 of FIG. 1; and FIG. 3 is an enlarged fragmentary sectional view as viewed along line 3—3 of FIG. 1.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings generally discloses a cap lining machine, designated by reference numeral 10. Cap lining machine 10 consists of a frame or base 12 which has a molding and curing head 14 rotatably supported thereon and a feed means 16 for continuously supplying unlined caps having a curable fluid compound to the rotating molding and curing head 14 at an inlet station 17. A take-off mechanism or means 18 is located at an outlet station 19 for removing the finished lined caps from the curing and molding head.

Molding and curing head or turret 14 (FIG. 2) consists of a plate 20 which is fixed to a shaft 22 that is rotatably supported in a bearing structure 24 defined on base 12 and is rotated through a suitable drive means, which will be described in more detail later. A plurality of molding and curing stations 26 (48 in number being illustrated in the drawings) are equally spaced around the periphery of plate 20 and each is designed to receive a cap having a charge of lining material therein and mold and allow the lining material to be cured while moving between the inlet station and the outlet station. The details of each station are illustrated in FIGS. 2 and 3, and include a plunger 28 which is reciprocated within openings 30 located in vertically spaced support plates 32 which are fixedly secured to base 20 by members 33 for rotation therewith. Each of the plungers 28 has a molding tip 34 at the lower end thereof and is normally biased into the position illustrated at the left-hand portion of FIG. 2 to a closed position by a biasing spring 36. In the closed position, each molding tip 34 cooperates with a recess or pocket 38 defined in plate 20 to clamp and grip a cap 39 for molding and curing the lining compound.

Each of the plungers 28 is moved to an open position by a camming mechanism which includes a camming surface 40 defined on the upper surface of a member 42 which extends around the perimeter of the molding head and is fixedly secured to base plate 12 through suitable support structure 44. Each plunger 28 has a cam roller 46 rotatably supported on the upper end thereof which is aligned with camming surface 40, as illustrated in FIGS. 1 and 2. The camming surface 40 is configured such that the respective plungers 28 are reciprocated between raised and lowered positions during each cycle of rotation of base plate 20. More specifically, the camming surface 40 has an inclined portion 48 located in close proximity to take-off mechanism 18 which cams plungers 28 upwardly to raise molding tips 34 sufficiently and allow caps to be removed from pockets 38 by the take-off mechanism 18. Camming surface 40 maintains plungers 28 in the raised position to allow the feeding mechanism 16 to insert new caps with uncured lining material into pockets 38 at the inlet station 17.

Each of the stations 26 is heated during each revolution of turret 20 to maintain molding tips 34 and the surfaces of pockets 38 at a curing temperature which is preferably on the order of 400° F. For this purpose, heating means 50 are located along the periphery of turret 20. Heating means 50 (FIG. 1) consists of arcuate gas burners 52 and 54 which are positioned as illustrated in FIGS. 1 and 2. Gas burner 52 directs flames to the lower surface of plate 20 while gas burner 54 directs flames to the periphery of plate 20 and each of the molding tips 34. In order to maximize the heating of tips 34, a heat shield or reflector 56 is located adjacent the inner periphery of tips 34 to reflect the heat towards the tips. Of course, while gas heaters have been shown, electric heaters could also be utilized.

Take-off mechanism 18 consists of a star wheel 60 that has a plurality of circumferentially spaced pockets 62 defined thereon which are capable of removing completed lined caps from the respective recesses 38 defined in plate 20 for transfer to a take-off conveyor 64 for subsequent processing and packaging. Star wheel 60 is supported on a shaft 66 which is rotated on base 12.

Feeding mechanism 16 consists of a star or feed wheel 70 that is supported on a shaft 72 which is rotatably supported within a bearing 74 secured to base 12. Feed wheel 70 is rotated by the drive means which will be described in more detail later. The feed wheel includes a plurality of circumferentially spaced pockets 76 (FIG. 1) which are defined between circumferentially spaced projections 78 and each pocket 76 is designed to receive an unlined cap 39 from a supply source 80. The supply source 80 includes a hopper or bowl 81 which is rotated to deliver oriented caps to supply chute 82.

Star wheel 70 has its peripheral portion received between a pair of fixed arcuate segments 83 and 84 (FIG. 3) which are interconnected at the periphery thereof through a member 86 and are fixedly secured to base 12 through suitable means not shown. Arcuate members 83 and 84 extend from cap closure inlet 90

(FIG. 1) to the transfer station between feed means 16 and turret 14. As illustrated in FIG. 3, the upper plate has a substantially circular opening 92 while lower plate has an opening 94 which are aligned with an outlet 96 of a dispensing means 100.

With the arrangement so far described, unlined caps 39 are fed from source 80 in oriented fashion so that they are inverted as illustrated in FIGS. 2 and 3 and are delivered to the respective pockets 76 on the periphery of feed wheel 70. As the inverted cap closures 39 are transferred along the peripheral path defined by plates 83, 84, and 86, predetermined amounts of curable fluid compound at substantially room temperature are dispensed into the center of the cap closures through the dispensing means which will now be described. The dispensing means is preferably a commercially available unit sold as a "Hot Melt" solenoid gun by the Aro Corporation, Bryan, Ohio under Model Nos. 656301/656302.

It has been determined that the commercially available unit with minor modifications can be utilized for dispensing predetermined charges of curable liquid lining compound at substantially more than one-thousand cycles per minute to unlined caps which are continuously moving with the pockets of the feed wheel 70. The details of the dispensing means 100 and the actuating means 128 are illustrated in FIG. 3.

Dispensing means 100 consists of a housing 102 that has an arm 104 extending therefrom and arm 104 is held in a fixed position on a support 106 extending above base 12 (FIG. 1). Housing 102 has a circular center chamber 110 defined therein which is in communication with outlet 96 and is adapted to be connected to a pressurized curable liquid lining compound through flexible hose 112. Chamber 110 has a polygonal member 114 reciprocated therein with a needle 116 at the lower end of the polygonal member. The needle is normally biased to a closed position illustrated in FIG. 3 through a biasing spring 120 engaging the upper surface thereof to close outlet 96. Member 114 and needle 116, which define needle means are reciprocable between a first closed position and a second open position through electric means which will now be described.

The electric means includes a solenoid 122 with member 114 defining the plunger for solenoid 122. Solenoid 122 is connected to a control box 124 which has a wire 126 leading therefrom to a receiving unit 128 of a photoelectric means. Photoelectric means also includes a light source 130 which is accurately positioned with respect to the periphery of feed wheel 70 through a support mechanism 132 that is fixedly secured to base 12. The control circuit may include a D-C power source with a time delay relay circuit therein.

Thus, as the feed wheel 70 is rotated, each time a projection 78 passes between the photocell 130 and the receiving pulsing unit 128, a pulse is transmitted to control box 124 and then to solenoid 122 to move the needle means from its first closed position to a second open position to allow a predetermined amount or charge 140 of material to be dispensed through the outlet 96 of dispensing means 100. Since the pulsating signal which energizes solenoid 122 is sensed from the rotating feed or star wheel 70, the predetermined charge is accurately positioned within the center of the unlined cap 80 at all times. Furthermore, by having openings 92 and 94 in the respective plates 83 and 84, if no unlined cap closure is located within a given pocket, the dispensed material can travel directly through the openings and be collected in a collection mechanism (not shown) for reuse at a subsequent time.

The liquid lining compound is continuously fed to chamber 110 from a source (not shown) in a pressurized state which is preferably on the order of 400 PSI. The compound flows between the surface of the polygonal plunger 114 and the surface of the circular chamber 110 to the lower reduced end having the needle 116 therein. It has been established that the lining compound, which is at room temperature, actually aids in maintaining the plunger and chamber surfaces at close to room temperature so that the dispensing means can be operated at rates of substantially more than one-thousand cycles per minute without heating the lining compound in the gun.

According to another aspect of the invention, the entire drive mechanism is devoid of any intermeshing gears to substantially increase the life of the unit and decrease the maintenance costs should there be a need for replacement of any of the components of the drive mechanism. As illustrated in FIG. 1, the drive mechanism consists of a motor 144 which may be fixedly secured to base 12 through any suitable means (not shown) with a drive sprocket 146 on the output shaft of motor 144. A further driven sprocket 148 is fixedly secured to shaft 22 and a timing belt 150 is entrained over sprockets 144 and 148. Since the timing belt and sprockets 146 and 148 can accurately rotate the molding and curing head 14 in relation to the rotation speed of motor 144, synchronized rotation is assured.

The feed wheel 70 is likewise driven from the same power source or motor 144 and for this purpose, turret shaft 22 has a second sprocket 154 (FIG. 2) secured thereto while shaft 72 has a further sprocket 156 secured thereto and a timing belt 158 is entrained over the two sprockets 154 and 156. Timing belt 158 is also utilized for operating the unlined cap feeding mechanism 82 which feeds the caps 39 in a proper oriented fashion to the feed wheel 70. For this purpose, a further idler sprocket 160 (FIG. 1) is supported for rotation on base 12 through a shaft 162. An additional sprocket 164 is also supported on base 12 and belt 158 is entrained over both of these additional sprockets. A further timing belt 166 is entrained over additional sprockets respectively located on shaft 162 and on a shaft 170 which forms part of the hopper feed mechanism 80 illustrated in FIG. 1. Thus, the feed wheel 70 and hopper drive mechanism are all driven in correlated synchronized relation with respect to the molding head 14.

In addition, the take-off feed mechanism 18 also is driven through the same power source and consists of a further additional timing belt 174 which is entrained over a further drive sprocket 176 (FIG. 2) on shaft 72 and an additional sprocket 178 secured to shaft 66 on take-off sprocket or star wheel 60.

Thus, all of the driven components are driven by a single source and are accurately synchronized with respect to each other through the various timing belts. This particular drive mechanism has a significant advantage in that the timing belts can more accurately synchronize the driving relation of the various components with respect to each other. Furthermore, in case there is a break down of any of the timing belts and/or gears associated therewith, the various components can readily be replaced in a matter of minutes without any substantial maintenance time. In contradistinction, when drive gears are utilized in a system of this type, if a gear is damaged and needs replacement, it is necessary to substantially completely tear down the entire unit which may require hours of maintenance.

By way of example and not of limitation, a specific drive mechanism will now be described. In order to produce 1080 crowns per minute, a motor having an output shaft rotated at 45 R.P.M. had a spocket having 36 teeth secured thereto and the turret shaft had a sprocket with 72 teeth with a timing belt interconnecting the two sprockets. The turret had 48 stations while the feed wheel had 24 pockets. The output star wheel had 18 pockets and a sprocket with 18 teeth while the feed shaft had a further sprocket with 36 teeth. Thus, all wheels including the drive for source 80 were operated in synchronized relation and lined caps were produced at a rate of 1080 per minute. This is in contrast to an identical molding head having 48 stations with a reciprocal feed mechanism and a plunger actuated liquid compound feed mechanism which had a production rate of less than 700 closures per minute.

The lining compound utilized to obtain the above production was a specific compound purchased from Chemical Products Division, CPL Corporation, East Providence, R.I., under the designation of D-3133.

Actual runs showed that the lining compound could be fully cured during the movement of the closures between the inlet and outlet stations with the metal on each of the stations maintained at a temperature in the neighborhood of 400° F. The hot melt gun was operated at substantially room temperature and the lining compound was used to maintain the chamber surfaces at substantially room temperature by eliminating the heating elements incorporated into the existing commercial "Hot Melt" gun produced by the Aro Corporation.

It is believed that the apparatus described above with some further refinements could produce lined closures at rates approaching 2000 closures per minute utilizing the commercially available gun.

What is claimed is:

1. In a cap lining machine having a rotating molding head with a plurality of circumferentially spaced stations adjacent the periphery thereof and means for feeding caps with a curable fluid compound at a rate of at least 900 caps per minute to said molding head, said means including a star wheel having a plurality of circumferentially spaced pockets on the periphery thereof for receiving unlined caps, drive means for continuously rotating said star wheel, feed means for continuously feeding unlined caps to respective pockets of said star wheel and metering means for dispensing predetermined quantities of curable fluid compound to each of said unlined caps, said metering means including a metering gun having a chamber with an outlet located above the path of said pockets and an inlet at an opposite end, supply means for supplying pressurized curable fluid compound at substantially room temperature to each cap; sensing means operatively connected to said electronically actuated needle means and cooperating with said star wheel for sensing the positions of respective pockets with respect to said outlet and actuating said needle means each time a pocket is aligned with said outlet, molding means on said molding head for molding said compound in said cap, and stationary heating means adjacent said molding head for fully curing said lining compound in said rotating molding head.

2. A cap lining machine having a continuously rotating molding and curing head with a plurality of circumferentially spaced stations defined on the periphery thereof and movable along a path, each station having a recess for receiving a cap and a plunger reciprocated between open and closed positions with means for moving said plunger between said positions during each cycle of revolution for said head, feed means for continuously supplying unlined caps having a curable fluid compound to each station, take-off means for removing lined caps from respective stations, and stationary heating means adjacent said molding and curing head between said feed means and said take-off means for supplying heat to said curing and molding head and maintaining the temperature of each station substantially above ambient temperature, the improvement of said feed means including a continuously rotating feed wheel having a plurality of circumferentially spaced pockets, unlined cap supply means for feeding caps to respective pockets, and curable fluid compound dispensing means for dispensing metered quantities of compound at a rate greater than 1000 cycles per minute to said respective unlined caps in said pockets, said dispensing means including a housing having a chamber defined therein with an inlet and an outlet at opposite ends of said chamber, a member in said chamber having a needle for opening and closing said outlet, said member and chamber cooperating to define an annular path between said inlet and said outlet, solenoid means surrounding said chamber for reciprocating said member and needle between open and closed positions, and pressurized compound supply means connected to said inlet for supplying compound at substantially room temperature to flow through said flow path when said outlet is open and be delivered to said caps at substantially room temperature, said caps with said compound therein being transferred from said pockets to said recesses while said plungers are in an open position, said plungers being moved to a closed position after said caps are received in said recesses to mold said compound, said heating means curing said compound while said caps are moved between said feed means and said take-off means, and said plungers are moved to an open position adjacent said take-off means to allow said caps to be removed from said recess.

3. A cap lining machine as defined in claim 2, further including sensing means connected to said solenoid means for sensing the arcuate position of each pocket and actuating said solenoid means each time a pocket is aligned with said dispensing means.

4. A cap lining machine as defined in claim 2, in which said wheel has spaced projections defining open pockets and said sensing means includes photoelectric means spaced from said gun for sensing movement of said projections past said photoelectric means.

5. A cap lining machine as defined in claim 2, further including synchronized drive means for driving said feed means, said molding and curing head and said take-off means, said drive means including a single drive motor, a timing belt interposed between said motor and said molding and curing head for rotating said head and additional timing belt, means for driving said feed wheel and said take-off means from said head.

6. A cap lining machine as defined in claim 5, in which said take-off means includes a rotary pocketed star wheel and said additional timing belt means includes a second timing belt interposed between said feed wheel and said head, and a third timing belt between said feed wheel and said star wheel.

* * * * *